(12) United States Patent
Albertson et al.

(10) Patent No.: US 8,590,166 B1
(45) Date of Patent: Nov. 26, 2013

(54) DEBRIS DEFLECTOR AND KNIFE FOR STRING TRIMMER

(76) Inventors: Robert V. Albertson, Alma, WI (US); Deah L. Udell, Wayzata, MN (US)

( * ) Notice: Subject to any disclaimer, the term of this patent is extended or adjusted under 35 U.S.C. 154(b) by 248 days.

(21) Appl. No.: 12/927,916

(22) Filed: Nov. 29, 2010

Related U.S. Application Data

(63) Continuation-in-part of application No. 29/348,803, filed on Feb. 12, 2010, now Pat. No. Des. 628,034, and a continuation-in-part of application No. 29/370,537, filed on Aug. 2, 2010.

(51) Int. Cl.
*B26B 25/00* (2006.01)

(52) U.S. Cl.
USPC ............................................ 30/276

(58) Field of Classification Search
USPC ............... 56/12.7, 17; 30/276, 277.4, DIG. 5; D8/8
See application file for complete search history.

(56) References Cited

U.S. PATENT DOCUMENTS

| | | | |
|---|---|---|---|
| 2,914,902 A | 12/1959 | Beymer | |
| 2,945,543 A | 7/1960 | Beyer | |
| 3,474,608 A | 10/1969 | Frick | |
| 4,200,978 A * | 5/1980 | Irelan et al. | 30/276 |
| D268,640 S | 4/1983 | Bonforte | |
| D268,641 S | 4/1983 | Bonforte | |
| 4,550,499 A * | 11/1985 | Ruzicka | 30/276 |
| 4,651,422 A * | 3/1987 | Everts | 56/12.7 |
| 4,722,139 A * | 2/1988 | Mahler | 30/276 |
| 4,823,464 A * | 4/1989 | Gorski | 30/276 |
| 4,864,728 A * | 9/1989 | Kloft et al. | 30/276 |
| 4,872,265 A * | 10/1989 | Powell | 30/276 |
| 5,060,383 A * | 10/1991 | Ratkiewich | 30/276 |
| 5,077,898 A * | 1/1992 | Hartwig | 30/276 |
| D342,874 S | 1/1994 | Groves | |
| D347,150 S | 5/1994 | Falconbridge | |
| 5,351,403 A * | 10/1994 | Becker et al. | 30/276 |
| 5,385,005 A * | 1/1995 | Ash | 56/12.7 |
| 5,394,612 A | 3/1995 | Wolfington | |
| 5,400,576 A | 3/1995 | Smith | |
| D357,482 S | 4/1995 | Forbush | |
| 5,402,627 A * | 4/1995 | Trompler et al. | 56/12.7 |
| 5,423,126 A * | 6/1995 | Byrne | 30/276 |
| 5,493,783 A * | 2/1996 | Oostendorp | 30/276 |
| 5,524,349 A * | 6/1996 | Dolin | 30/276 |
| D373,712 S * | 9/1996 | Bridgers | D8/8 |
| 5,584,348 A * | 12/1996 | Butler | 56/12.7 |
| D389,382 S | 1/1998 | Houle | |
| D391,815 S | 3/1998 | Venezio | |
| D395,383 S | 6/1998 | Mohindru | |
| 5,839,262 A * | 11/1998 | Sorensen | 30/276 |
| D408,696 S | 4/1999 | Simpson, Sr. | |
| 5,924,205 A * | 7/1999 | Sugihara et al. | 30/276 |
| 5,996,234 A * | 12/1999 | Fowler et al. | 30/276 |
| 6,226,876 B1 * | 5/2001 | Ezell | 30/276 |
| 6,324,765 B1 * | 12/2001 | Watkins, Sr. | 30/276 |
| 6,327,782 B1 * | 12/2001 | Blevins | 30/276 |
| D463,230 S * | 9/2002 | Robson | D8/8 |
| 6,655,034 B2 * | 12/2003 | Richardson et al. | 30/276 |

(Continued)

*Primary Examiner* — Jason Daniel Prone
(74) *Attorney, Agent, or Firm* — Richard John Bartz

(57) ABSTRACT

A string trimmer equipped with a knife and deflector apparatus mounted on the shroud directs cut debris laterally away from a workperson operating the string trimmer. A knife cutting edge located below the shroud cuts vegetation moved by the revolving string into cut debris. An upwardly extended radial deflector mounted on the shroud directs the cut debris laterally away from the shroud and workperson.

3 Claims, 15 Drawing Sheets

(56) References Cited

U.S. PATENT DOCUMENTS

| | | | |
|---|---|---|---|
| 6,658,741 B2 | 12/2003 | Paluszek | |
| 6,665,942 B2 * | 12/2003 | Richardson et al. | 30/276 |
| 6,742,263 B2 * | 6/2004 | Ellson et al. | 30/276 |
| 6,751,871 B2 * | 6/2004 | Furnish | 30/276 |
| 6,757,980 B2 * | 7/2004 | Arsenault | 30/286 |
| 6,842,985 B2 * | 1/2005 | Richardson et al. | 30/276 |
| 6,892,461 B2 * | 5/2005 | Peterson | 30/276 |
| 7,284,331 B2 * | 10/2007 | Paddock | 30/276 |
| 7,406,771 B2 * | 8/2008 | Zimmermann et al. | 30/276 |
| D588,881 S | 3/2009 | Spencer | |
| D628,034 S * | 11/2010 | Albertson et al. | D8/8 |
| 7,836,602 B2 * | 11/2010 | Langhans et al. | 30/276 |
| 7,963,041 B1 * | 6/2011 | Smith | 30/347 |
| D645,313 S * | 9/2011 | Albertson et al. | D8/8 |
| 8,256,120 B2 * | 9/2012 | Million et al. | 56/12.8 |
| 2002/0007559 A1 * | 1/2002 | Morabit et al. | 30/276 |
| 2002/0166244 A1 * | 11/2002 | Williams | 30/276 |
| 2004/0031157 A1 * | 2/2004 | Arsenault | 30/276 |
| 2005/0022392 A1 * | 2/2005 | Hanes et al. | 30/276 |
| 2005/0183269 A1 * | 8/2005 | Thompson | 30/276 |
| 2006/0112568 A1 * | 6/2006 | Jerez | 30/276 |
| 2006/0123635 A1 * | 6/2006 | Hurley et al. | 30/276 |
| 2006/0156552 A1 * | 7/2006 | Schilling | 30/276 |
| 2007/0028459 A1 * | 2/2007 | Thomson et al. | 30/276 |
| 2007/0074403 A1 * | 4/2007 | Robison | 30/276 |
| 2007/0089302 A1 | 4/2007 | Paddock | |
| 2008/0141541 A1 * | 6/2008 | Hurley | 30/276 |
| 2008/0271325 A1 * | 11/2008 | Hurley | 30/276 |
| 2009/0217637 A1 * | 9/2009 | Dunn | 56/12.7 |
| 2011/0214294 A1 * | 9/2011 | Galinski | 30/276 |

* cited by examiner

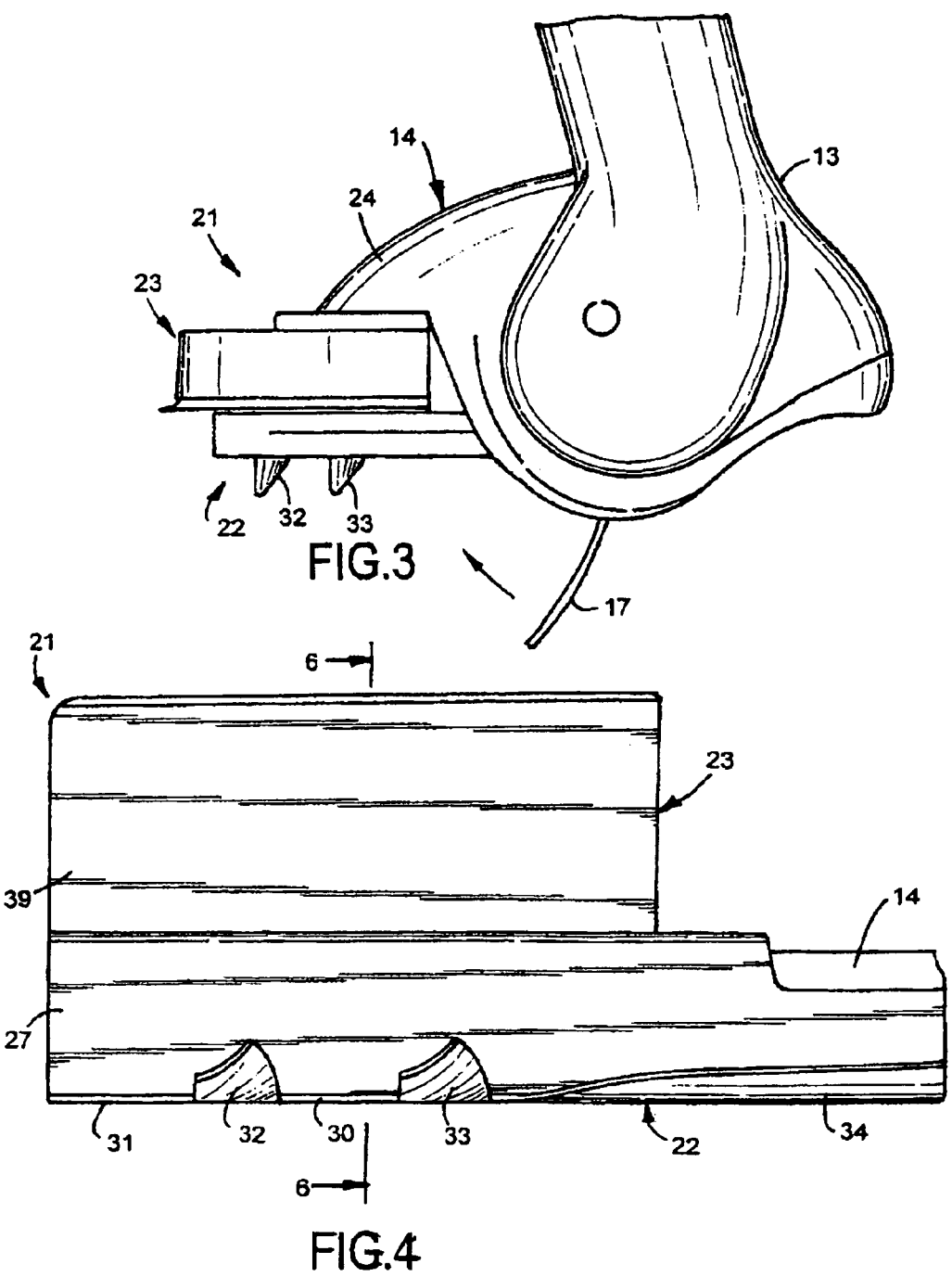

DEBRIS DEFLECTOR AND KNIFE FOR STRING TRIMMER

CROSS REFERENCE TO RELATED APPLICATION

This application is a continuation-in-part of U.S. application Ser. No. 29/348,803 filed Feb. 12, 2010 now U.S. Pat. No. D. 628,034 and U.S. application Ser. No. 29/370,537 filed Aug. 2, 2010.

FIELD OF THE INVENTION

The invention relates to string trimmers for cutting vegetation, such as grass, weeds, hay and crops, having shields to protect the workpersons operating the string trimmers and knives for cutting the vegetation.

BACKGROUND OF THE INVENTION

String trimmers have internal combustion engines or electric motors mounted on tubular shafts connected to rotary string cutting heads for cutting grass, weeds and vegetation. Guards and shrouds mounted on the cutting heads or shafts above the rotating strings are limited in size and shape. They do not adequately protect the workperson from grass clippings, debris, and objects being thrown rearwardly over the shrouds onto the legs and feet of the workperson operating the string trimmer. Shields and skirts for string trimmers are disclosed in the prior art to prevent grass cuttings and debris from being directed toward the legs and feet of the workperson using the string trimmer. Examples of these string trimmers with shields and skirts are present in the following U.S. Patents.

M. Kloft and G. Zerrer in U.S. Pat. No. 4,864,728 discloses a brush cutter having a motor driven cutting tool for cutting vegetation. A protective cover plate overlaps the cutting tool. A downwardly extending wall supports a detachable skirt that projects below the wall and beneath the rotational plane of the cutting tool. The skirt deflects stones and other hard objects propelled by the cutting tool to protect the operator against injury.

T. E. Ezell in U.S. Pat. No. 6,226,876 describes a debris shield for a string trimmer having an elongated shaft connected to string cutting head. The shield has a bracket mount on the shaft above the cutting head. The shield extends downward to generally contact the ground to prevent grass cuttings from being thrown under the shield onto the legs and feet of the user.

Paluszek in U.S. Pat. No. 6,658,741 discloses a cutting member mounted on a guard after string trimmers that cuts vegetation in concert with the rotating string. The cutting member mounted on the bottom of the guard has an L-shaped knife with a cutting edge that extends forwardly of the forward edge of the guard. The string strikes vegetation against the knife whereby the vegetation is cut by the string and knife. The knife acts to second cut the vegetation in a mulching effect.

C. W. Paddock in U.S. Patent Application Publication 2007/0089302 discloses a foldable skirt mounted on a grass trimmer shaft rearwardly of a shroud located over a string cutting head. Arms pivotally mounted on a clamp mounted on a shaft support the skirt rearwardly of the shroud and string cutting head to provide protection of the workperson from flying grass and debris.

SUMMARY OF THE INVENTION

A string trimmer having a motor driven cord located below a shroud is equipped with a knife and deflector for cutting vegetation, such as grass, weeds, hay and plants, and directing cut debris generally laterally away from the shroud and workperson operating the string trimmer. The knife has a radial knife edge located below the shroud and above the circular path of the moving cord whereby vegetation is forced into contact with the knife edge by the moving cord thereby cutting the vegetation into debris. The deflector is an upward directed radial extended generally flat plate located above the knife and shroud. The plate has a front face that directs air and debris generally laterally away from the shroud and workperson operating the string trimmer. A support joined to the knife and deflector retains the knife and deflector on the shroud. At least one fastener secures the support to the shroud.

DESCRIPTION OF THE DRAWING

FIG. 3 is an enlarged top plan view of the string trimmer cutting head housing, shroud and combined debris deflector and knife apparatus of FIG. 2;

FIG. 4 is an enlarged front elevational view of the combined debris deflector and knife apparatus of FIG. 3;

DESCRIPTION OF THE INVENTION

Figure 1:
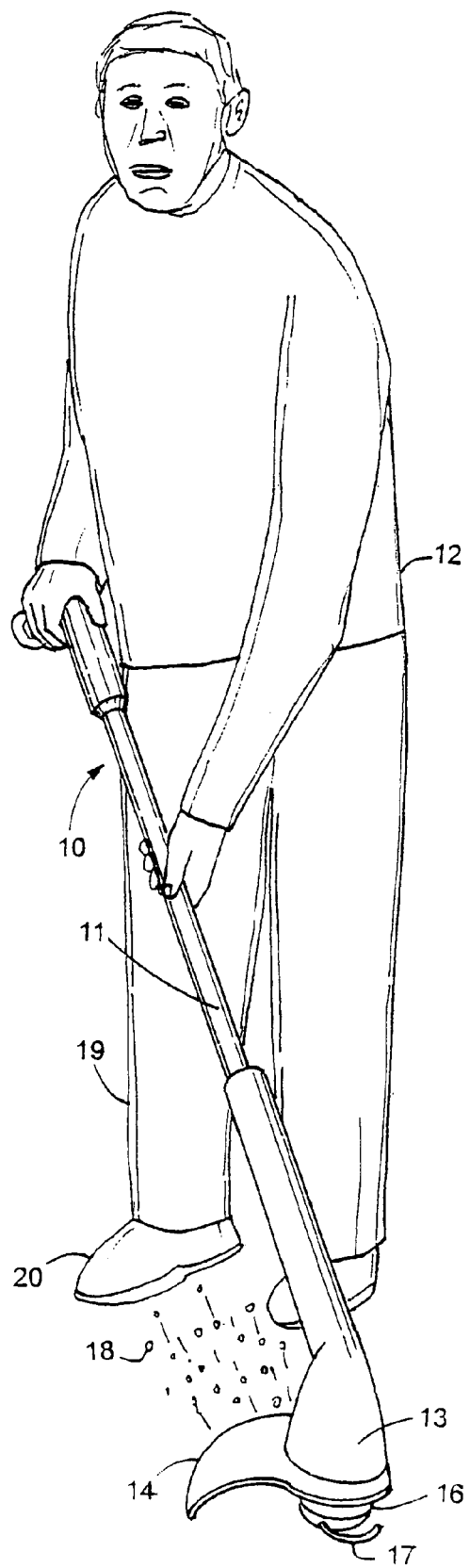
FIG. 1 is perspective view of a prior art string trimmer used by a workperson for cutting grass with grass debris propelled and splattered on the legs and feet of the workperson.
Figure 2:
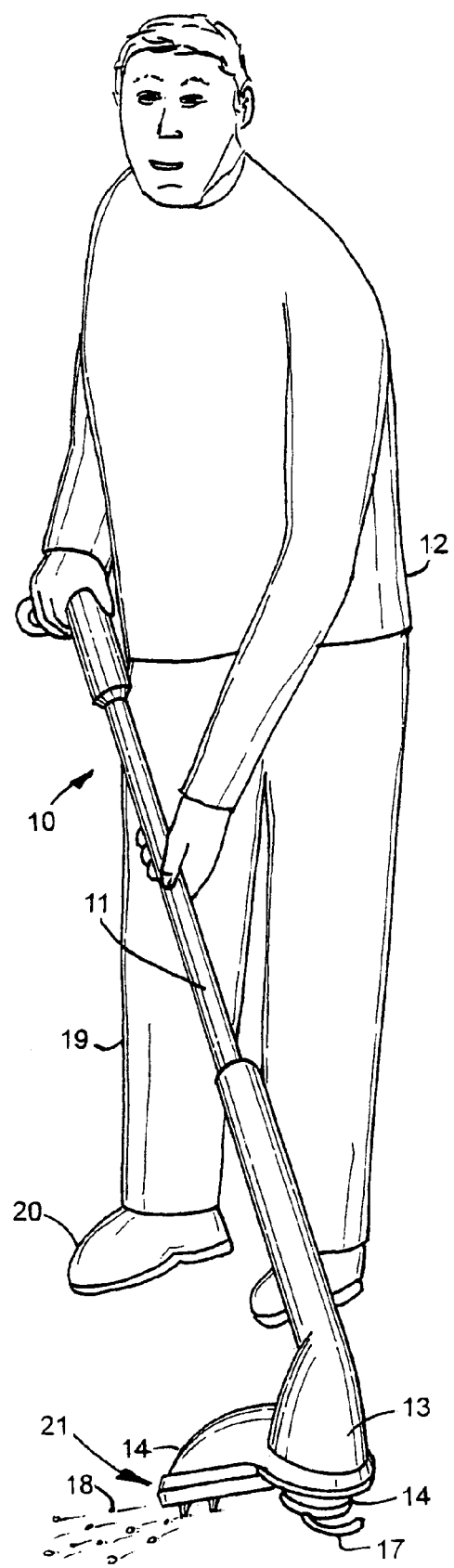
FIG. 2 is a perspective view of a string trimmer equipped with a first embodiment of a debris deflector and knife apparatus used by a workperson for cutting grass.

As shown in FIG. 1, conventional string trimmers 10 has an elongated handle 11 used by a workperson 12 to cut grass, weeds, hay and plants. String trimmer 10 has a cutting head 13 containing a motor drivably connected to a spool 16 operatively connected to a string or cord 17, such as an elongated flexible plastic line. The motor turns cord 17 in a circumferential path. A housing or shroud 14 mounted on head 13 extends rearwardly and above the path of the moving cord 17. The moving turns cord 17 cuts the vegetation, such as grass, weeds, hay, and plants and propels and drives cut debris along with air rearwardly to unhappy workperson's legs 19 and feet 20. The debris can include sticks, stones and dirt along with grass and weed clippings that impinge on workperson's legs 19 and feet 20. This is a dirty and untidy working environment which can injure the workperson 12.

The first embodiment of the combined deflector and knife apparatus 21 of the invention, shown in FIGS. 2 to 8, operates to cut vegetative, such as grass, weeds, hay and plants and direct the cut debris 18 laterally away from workperson 12. Debris 18 does not impinge on legs 19 and feet 20 of happy workperson 12. Apparatus 21 has a knife 22 and deflector 23 mounted on the top wall 24 of shroud 14. Knife 22 located adjacent the front of the shroud side wall 26 extends inwardly above the circular path of cord 17. As shown in FIGS. 4 and 6 to 8, knife 22 has a downwardly extended front wall 27 joined to a horizontal top wall 28. Fasteners 36 and 37, shown as nut and bolt assemblies, mount top wall 28 on top of shroud wall 24. Knife 22 has a radial knife section 29 joined to the bottom of front wall 27. The front of knife section has a pair of cutting edges 30 and 31. An upwardly and outwardly curved finger 32 separates cutting edges 30 and 31. A second upwardly and outwardly curved finger 33 separates cutting edge 30 with an inwardly directed upwardly curved section 34. The upwardly curved fingers 32 and 33 and section 34 prevent cord 17 from being cut by knife edges 30 and 31.

Figure 5:
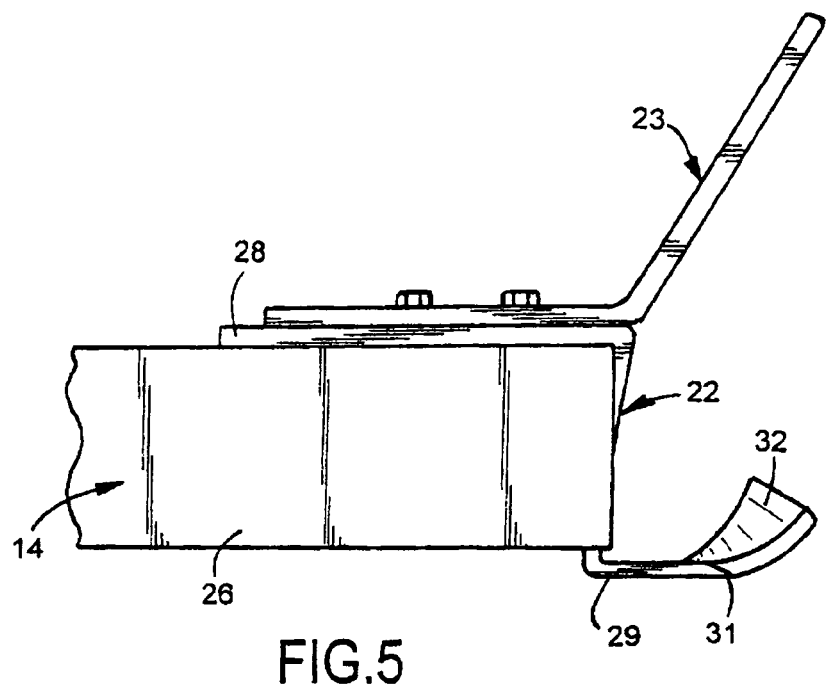
FIG. 5 is an end elevational view of the left end of FIG. 4.
Figure 6:
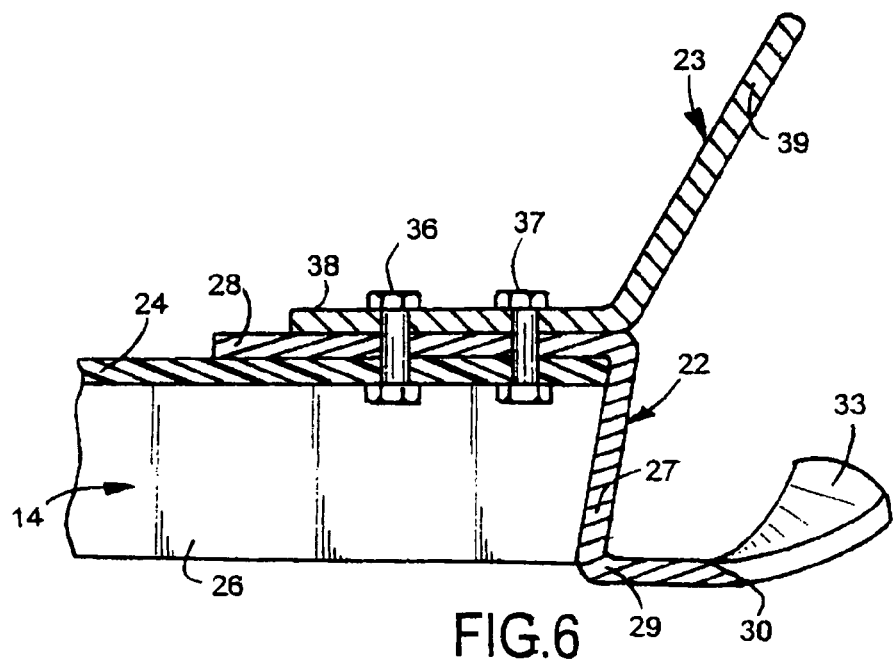
FIG. 6 is a sectional view taken along line 6-6 of FIG. 4.
Figure 7:
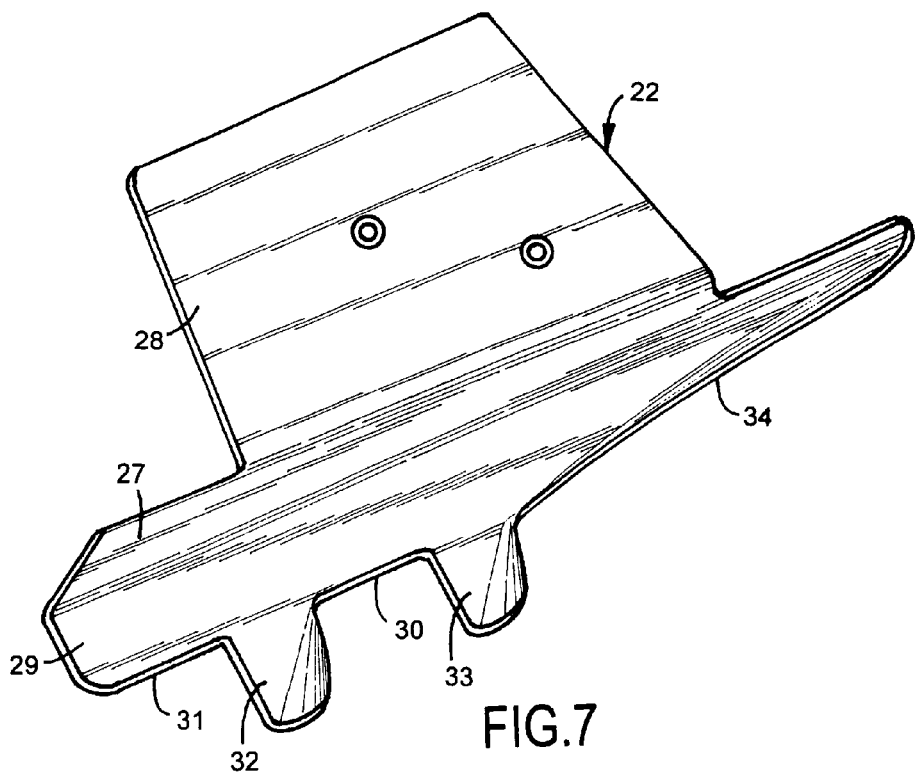
FIG. 7 is a perspective view of the knife apparatus of FIG. 2.
Figure 8:
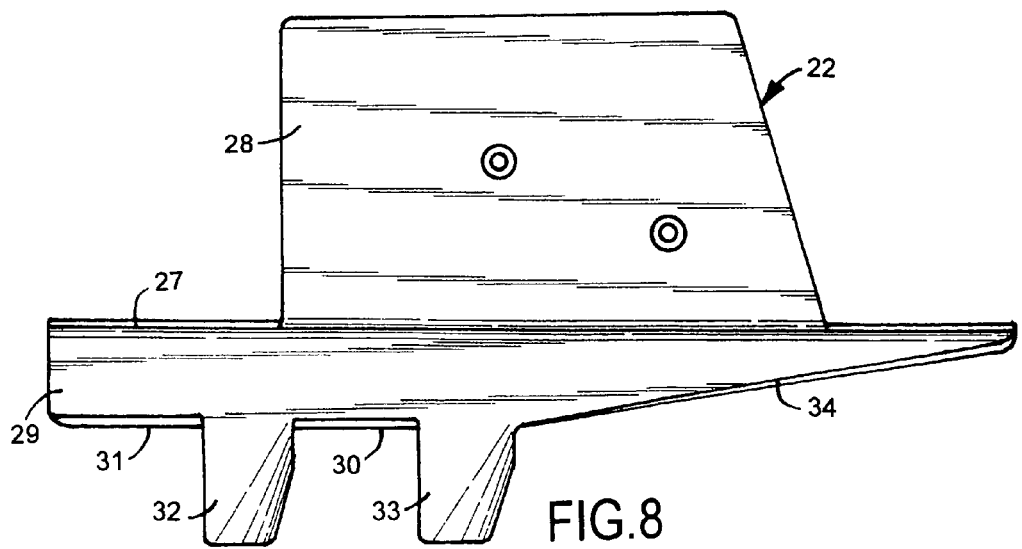
FIG. 8 is a top plan view of the knife apparatus of FIG. 2.
Figure 9:
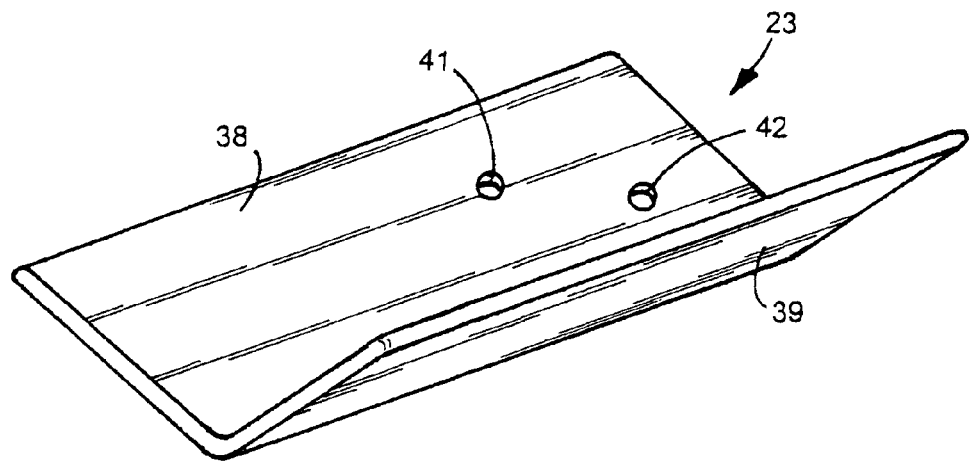
FIG. 9 is a perspective view of the debris deflector of FIG. 2.
Figure 10:
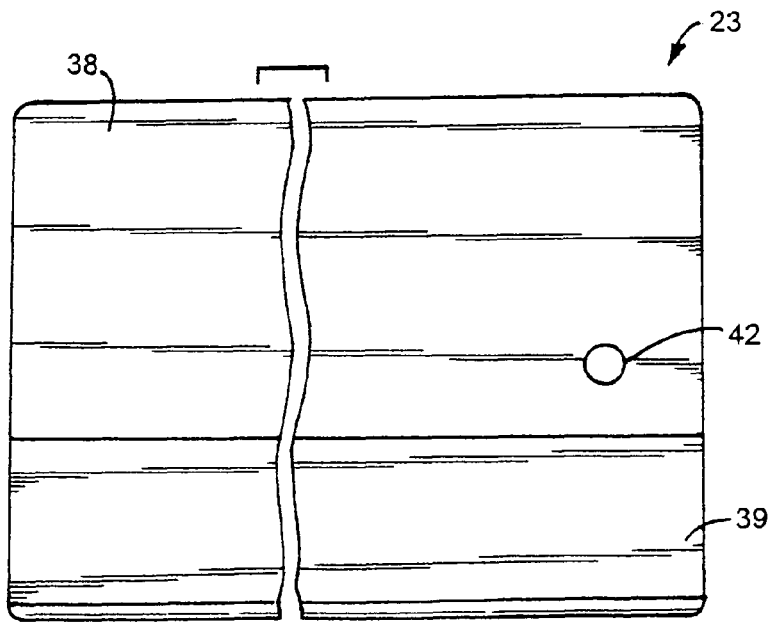
FIG. 10 is a foreshortened enlarged top plan view of the debris deflector of FIG. 2.
Figure 11:
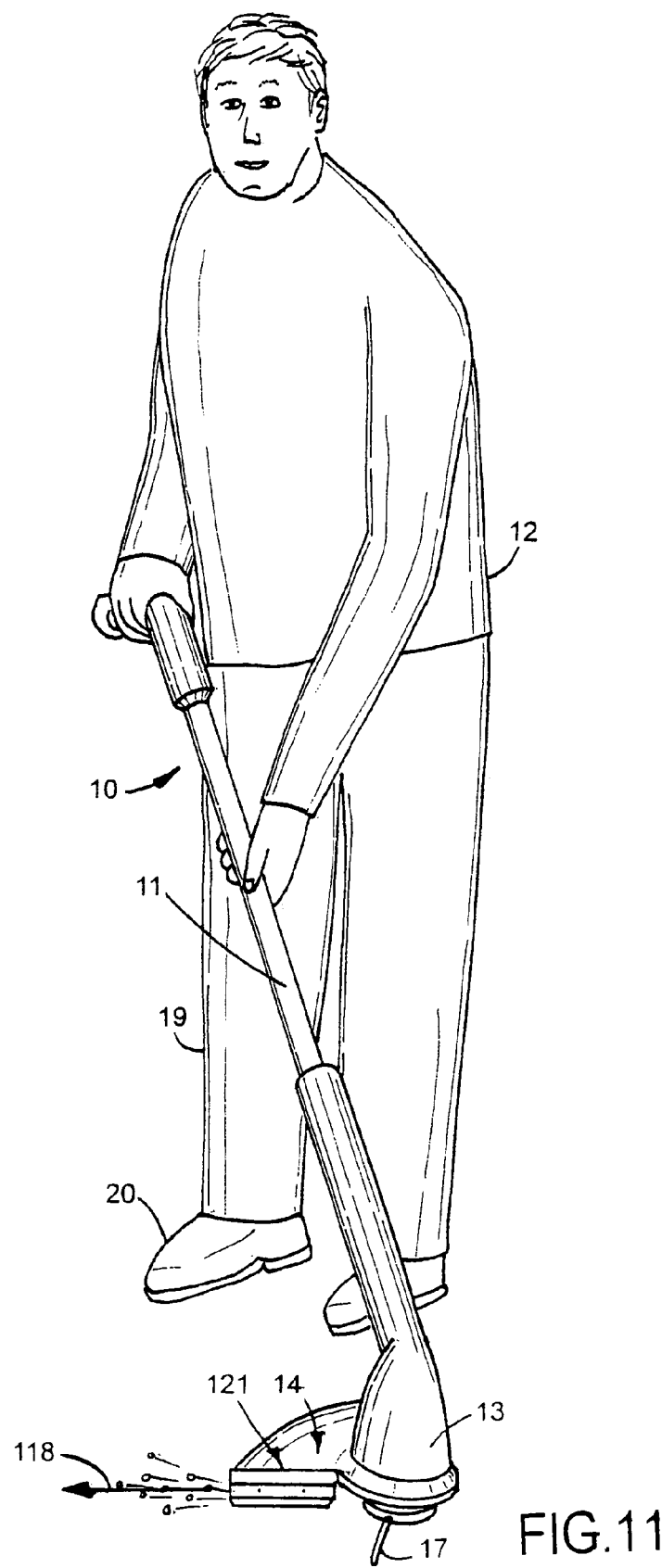
FIG. 11 is a perspective view of a string trimmer equipped with a second embodiment of a debris deflector and knife apparatus used by a workperson for cutting grass.
Figure 12:
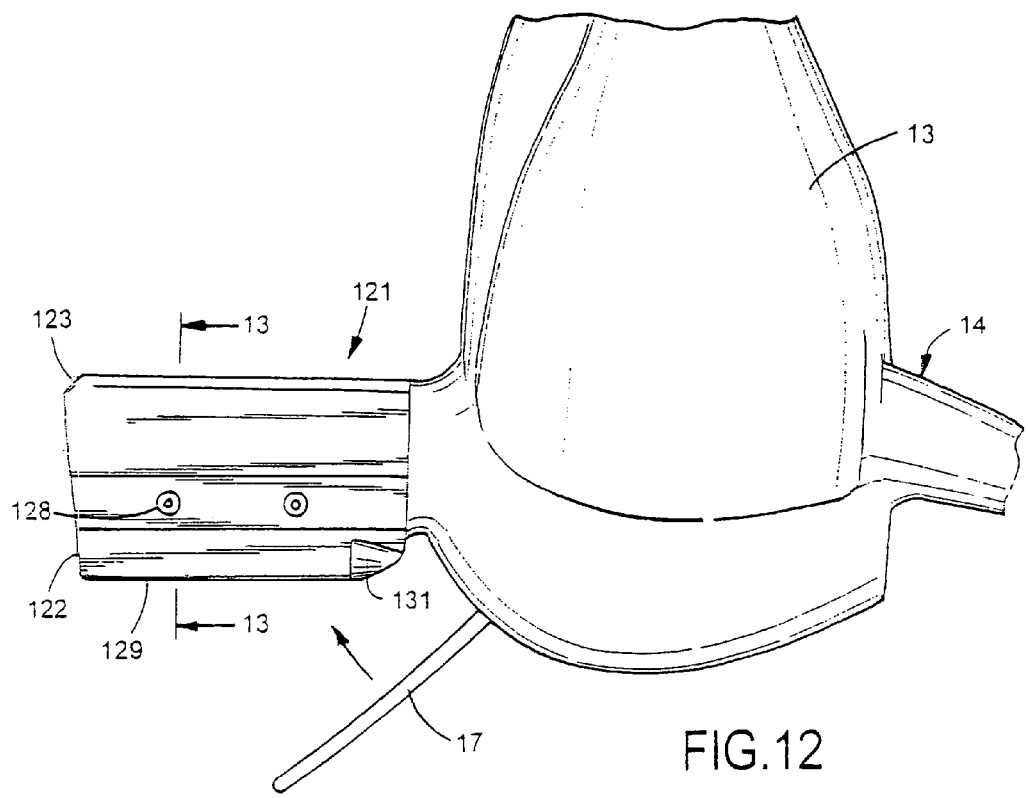
FIG. 12 is an enlarged front elevational view of the debris deflector and knife apparatus on the shroud of the string trimmer of FIG. 11.
Figure 13:
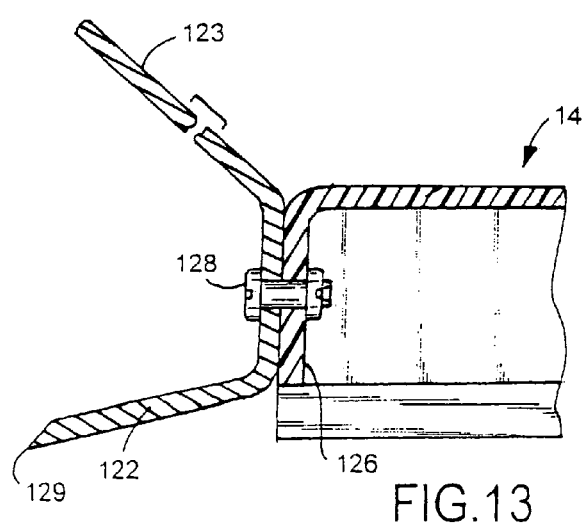
FIG. 13 is a foreshortened sectional view taken along line 13-13 of FIG. 12.
Figure 14:
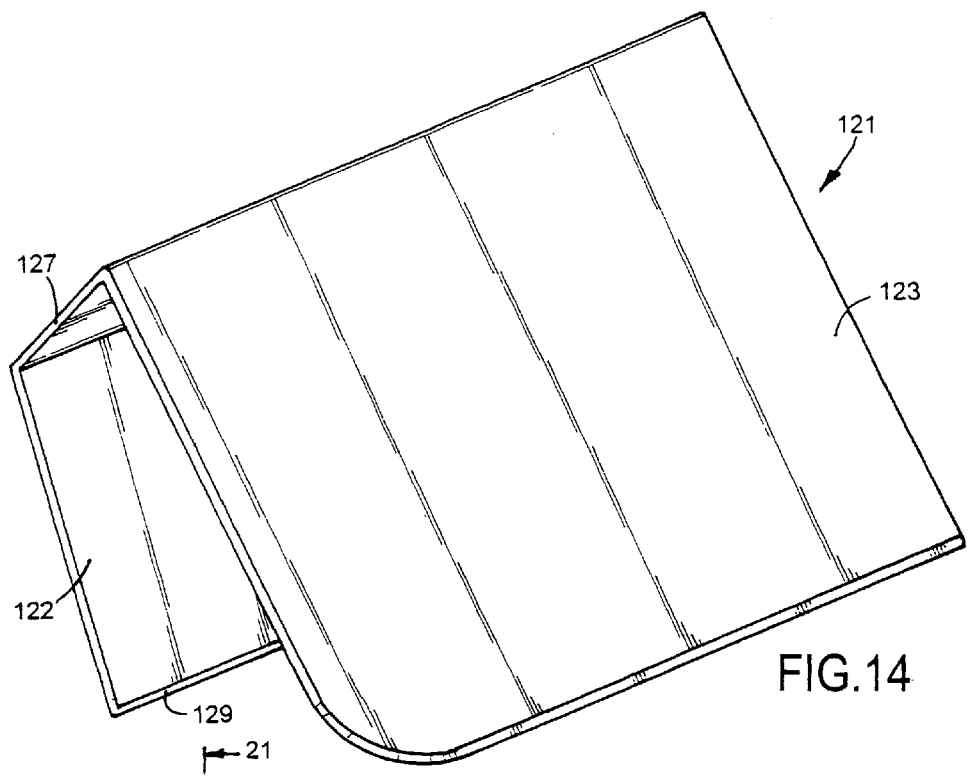
FIG. 14 is an enlarged perspective view of the debris deflector and knife apparatus of FIG. 12.
Figure 15:
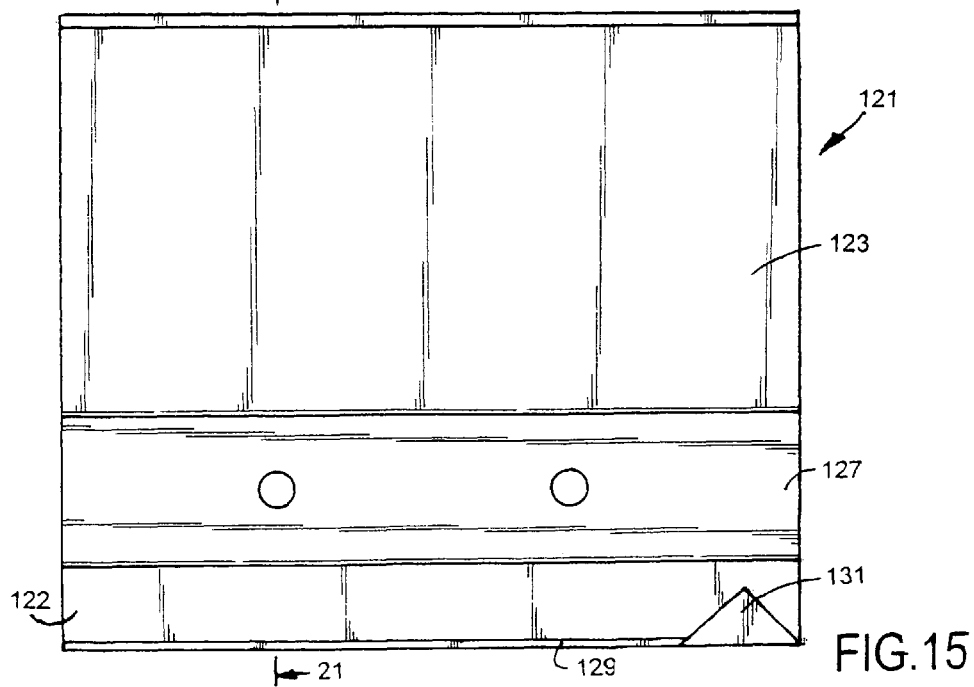
FIG. 15 is an enlarged front elevational view of the debris deflector and knife apparatus of FIG. 12.
Figure 16:
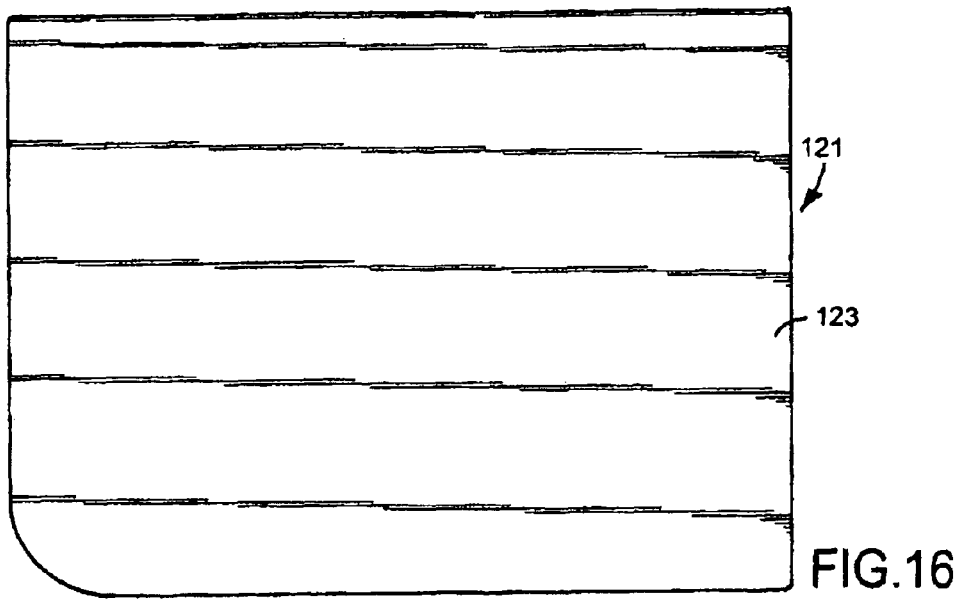
FIG. 16 is an enlarged top plan view of the debris deflector and knife apparatus of FIG. 12.
Figure 17:
FIG. 17 is an enlarged bottom plan view of the debris deflector and knife apparatus of FIG. 12.
Figure 18:
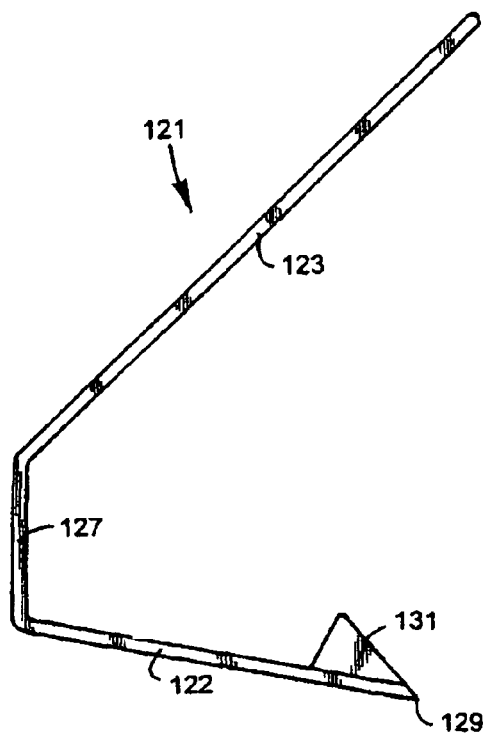
FIG. 18 is an enlarged side elevational view of the left side of the debris deflector and knife apparatus of FIG. 12.
Figure 19:
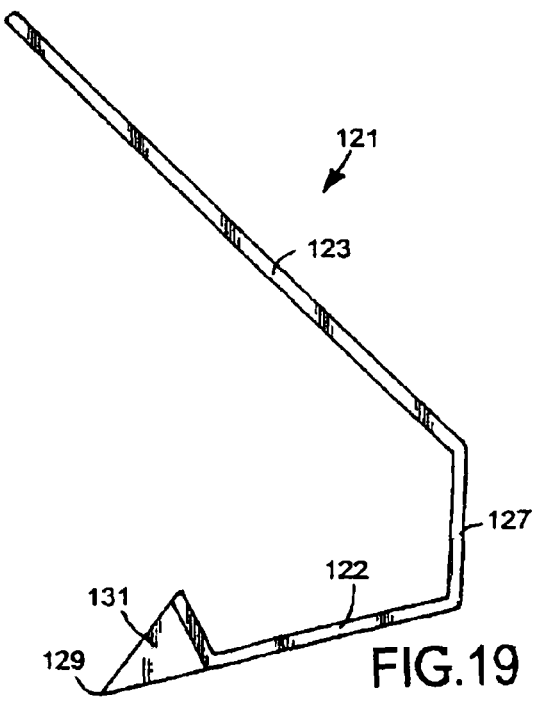
FIG. 19 is an enlarged side elevational view of the right side of the debris deflector and knife apparatus of FIG. 12.
Figure 20:
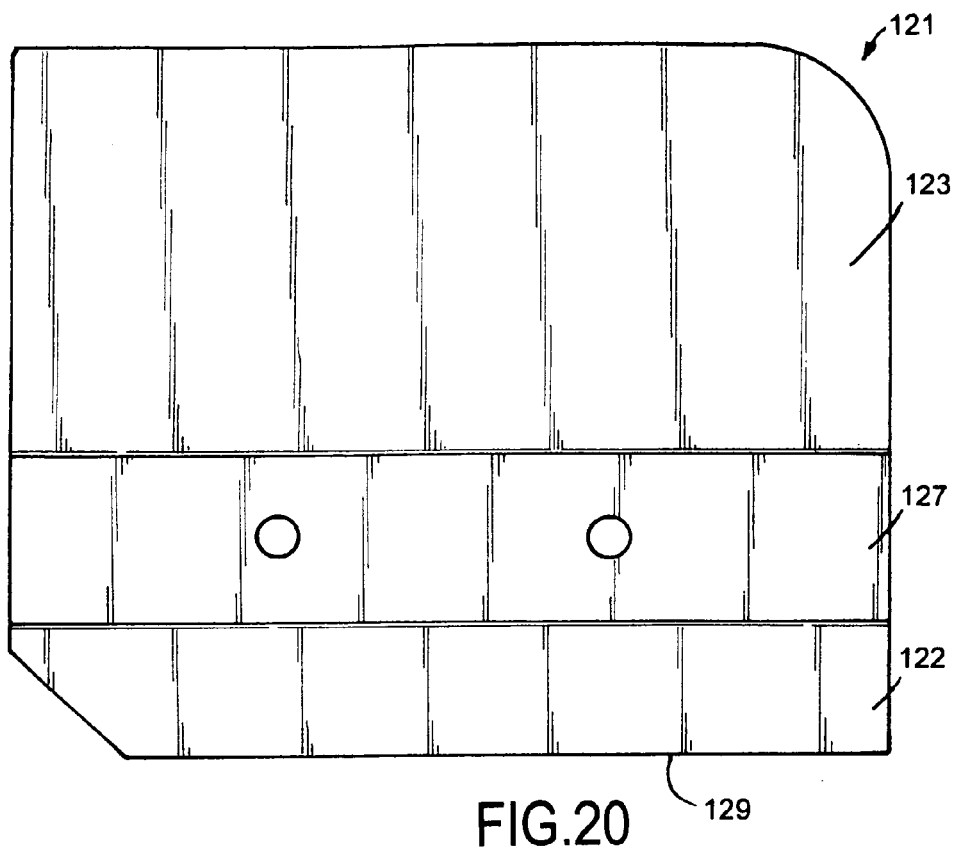
FIG. 20 is an enlarged rear elevational view of the debris deflector and knife apparatus of FIG. 12.
Figure 21:
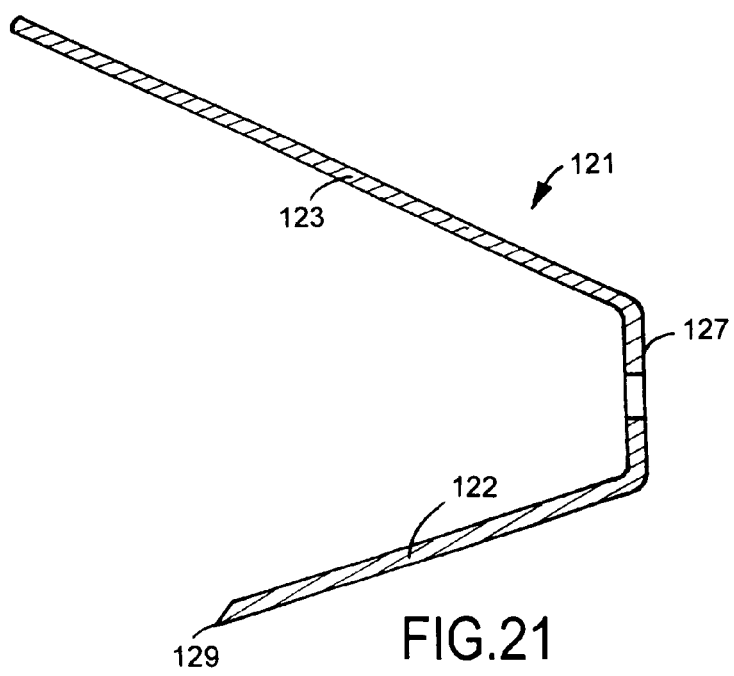
FIG. 21 is a sectional view taken along the line 21-21 of FIG. 15.

Deflector 23 has a support or member 38 and an upwardly directed front member 39. Member 38 is a flat metal plate. Front member 39 is a generally flat plate having a front face located above shroud 14 and knife 22. Fasteners 36 and 37 secured member 38 to top wall 28, as shown in FIGS. 5 and 6. Member 38 has a pair of holes 41 and 42 accommodating fasteners 36 and 37. Other connections, such as welds, can be used to secure front member 39 to knife 22. Deflector 23 can be mounted directly on top wall 24 of shroud 14. Deflector front member 39 has a width of 10 cm and extends upwardly and forwardly at an angle of 45 degrees from the horizontal top wall 24 of shroud 14. Front member 39 can have other sizes, shapes and upright inclinations. As shown in FIGS. 9 and 10, front member 39 has a flat continuous face to deflect cut debris away from workperson's legs 19 and feet 20. Also, sticks, stones and dirt are carried by the moving cut debris and air laterally of shroud 14. The vegetation moved by the revolving cord 17 into contact with knife edge 30, 31 results in a clean straight cut of the top ends of grass. The ends of the grass are not shredded and do not expose strings of grass ends to atmosphere. The cutting of the vegetation is effective and efficient with low motor power requirements.

A second embodiment of the knife and deflector apparatus 121, shown in FIGS. 11 to 21, mounted on a shroud 14 of a string trimmer 10 in use directs cut debris 118 away from legs 19 and feet 20 of workperson 12. Apparatus 121 has a knife member 122 having a front linear radial knife edge 129. The inner end of knife member 122 has an upwardly turned ear 131 that deflects cord 17 away from knife edge 129. A back wall 127 joins knife member 122 to a front wall of deflector 123. Knife and deflector apparatus 121 is a one-piece metal member attached to a front wall 126 of shroud 14 with fasteners 128, shown as nut and bolt assemblies. Knife member 122, as seen in FIGS. 13, 18, 19 and 21, extends downwardly and forwardly locating knife edge below the bottom horizontal plane of a shroud 14. Knife member 122 is inclined 15 to 20 degrees downwardly and forwardly of the front of shroud 14. Front wall 123 has a continuous flat face that directs cut debris laterally away from shroud 14 and workperson 12. Front wall 123 extends upwardly and forwardly at an angle of 45 degrees relative to the horizontal plane of shroud 14. Other sizes and angles of front wall 123 can be used to deflect cut debris away from workperson 12.

An example of knife and deflector apparatus 121 is a one-piece sheet metal member of stainless steel, shown in FIGS. 14 to 21, with a length of 13 cm. The back wall 127 is a support having a width of 3 cm with opposite edges joined to knife member 122 and front wall 123. Knife wall 122 has a width of 6 cm with ear 131 being a triangular-shaped member having a height of 1 cm. The front wall 123 has a width of 10 cm.

Figure 22:
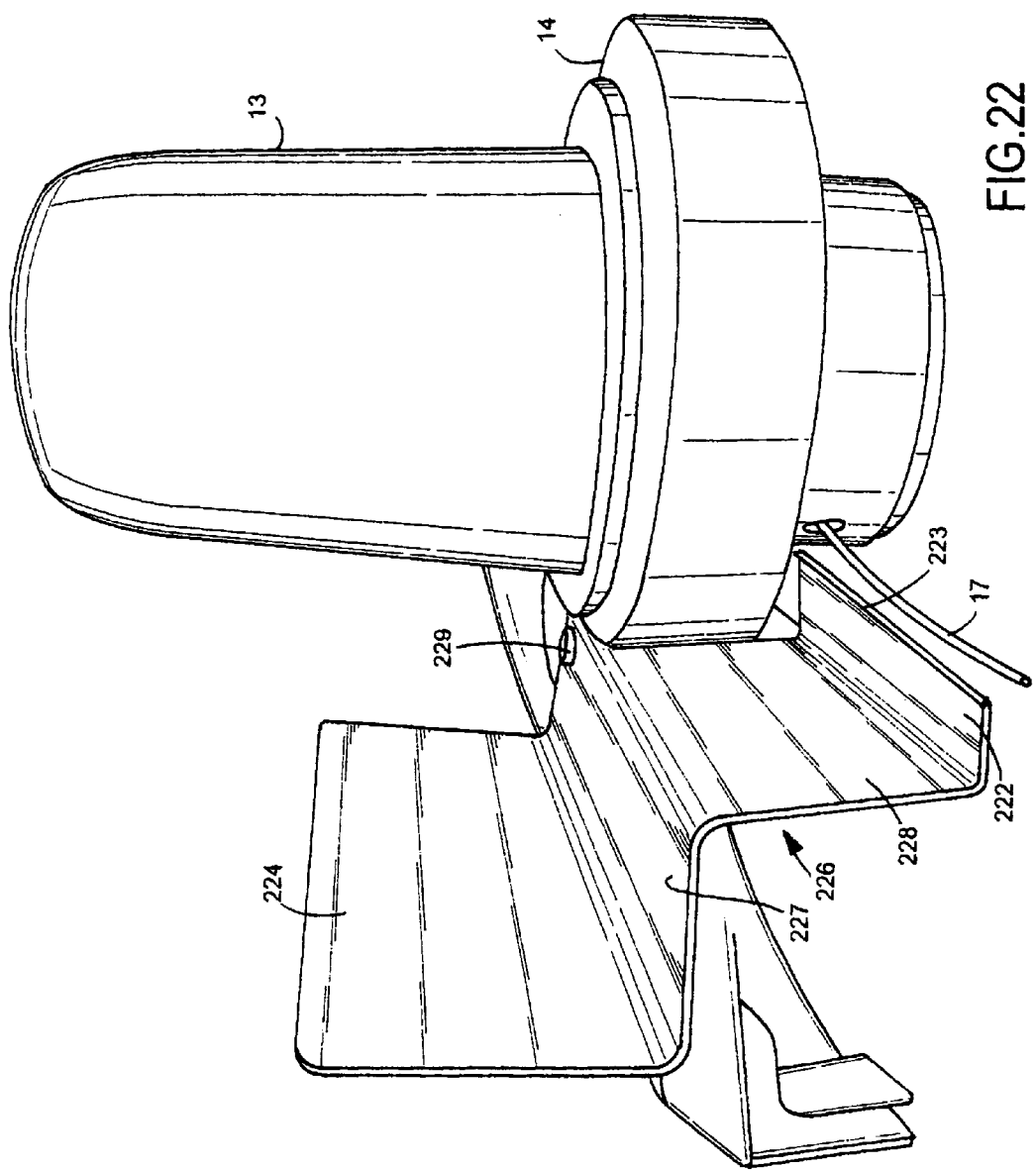
FIG. 22 is a perspective view of a grass trimmer head with a third embodiment of a debris deflector and knife apparatus attached to the shroud of the grass trimmer.
Figure 23:
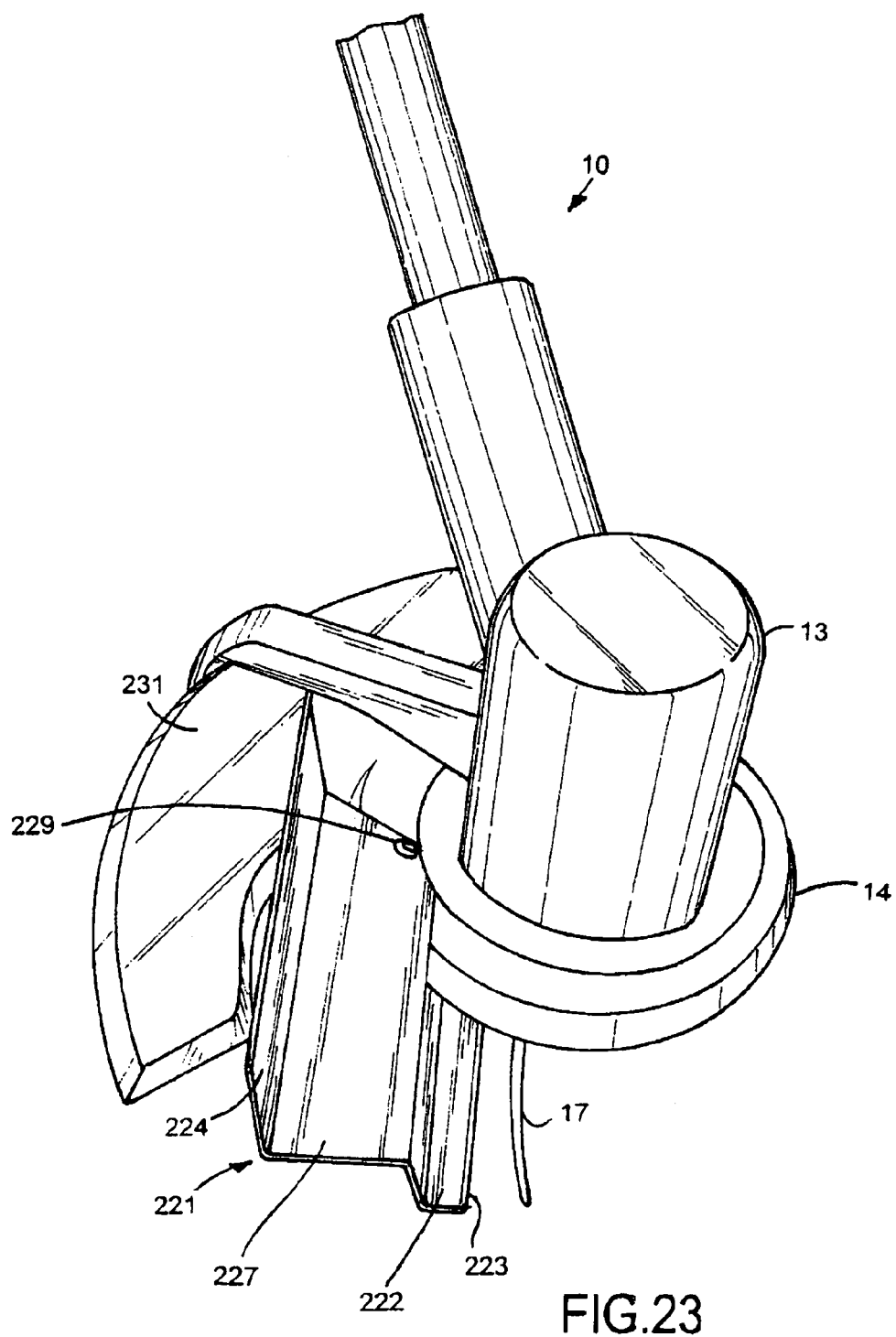
FIG. 23 is a top plan view of FIG. 22.

A third embodiment of the knife and deflector unit 221, shown in FIGS. 22 and 23, mounted on shroud 14 directs cut debris laterally away form shroud 14 and the workperson operating the string trimmer. Knife and deflector apparatus 221 is a one-piece metal member with a horizontal knife 222 having a radial cutting edge 223 located below shroud 14 and above the circular path of moving cord 17. Cord 17 operates to move vegetation, including grass, weeds, hay and plants, into contact with edge 223 and cutting the vegetation into cut debris. A radial deflector 224 extended upwardly from shroud 14 has a generally flat front surface or face that directs air and cut debris laterally away from shroud 14 and the workperson operating the string trimmer. A horizontal support member 227 and a downwardly directed member 228 joins knife 222 to deflector 224. Member 228 has a generally flat radial surface or face that also directs air and cut debris laterally away from shroud 14. Knife and deflector apparatus 221 is pivotally mounted on shroud 14 with a pivot member 229, shown as a nut and bolt assembly. Pivot member 229 allows knife and deflector apparatus 221 to be angularly adjusted on shroud 14 to change the circumferential location of radial cutting edge 223. Additional fasteners can be used to fix the location of knife and deflector on shroud 14.

Figure 24:
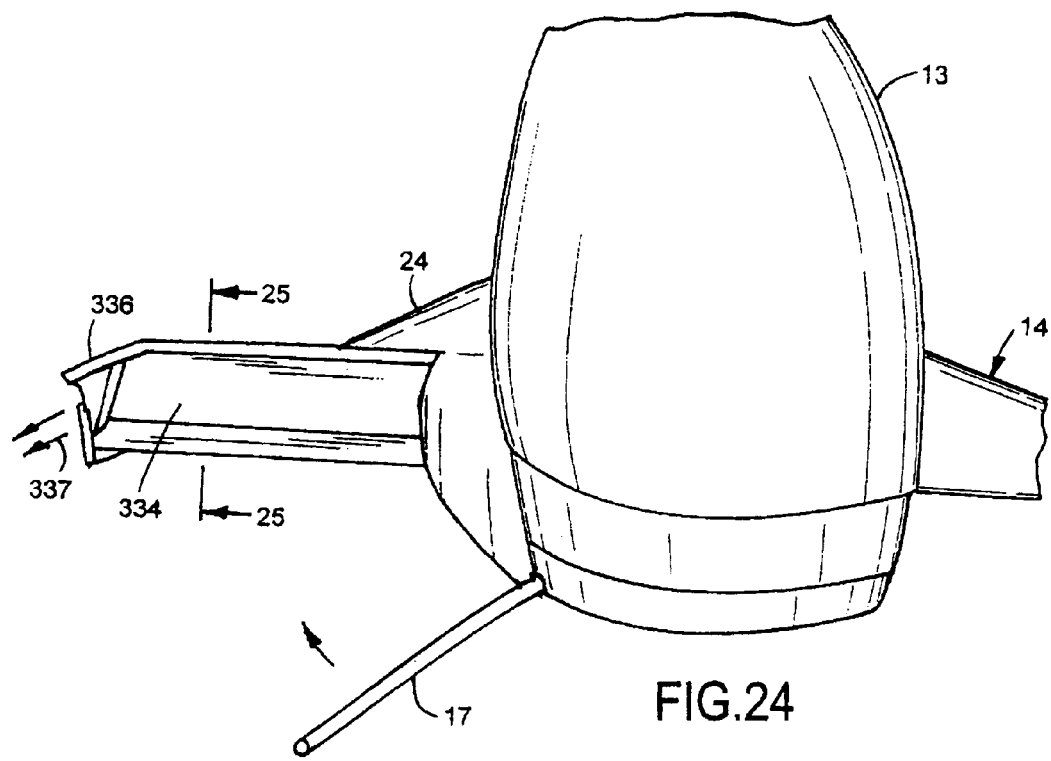
FIG. 24 is a front elevational view of a debris deflector mounted on the shroud of a string trimmer.
Figure 25:
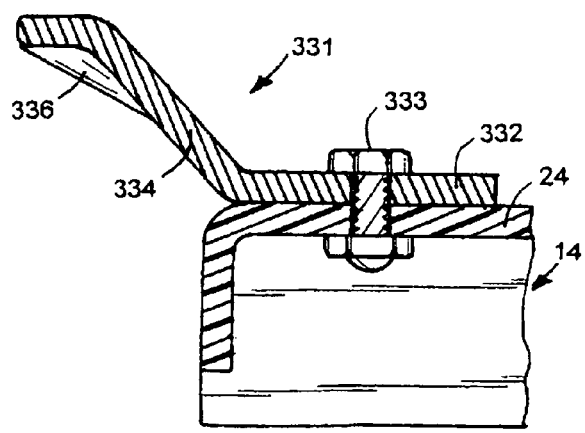
FIG. 25 is a sectional view taken along line 25-25 of FIG. 24.

A fourth embodiment of the debris deflector 331, shown in FIGS. 24 and 25, is mounted on shroud 14 of a string trimmer to direct air and cut debris laterally away from shroud 14 and housing 13 of the string trimmer and from the workperson operating the string trimmer. Deflector 331 is a one-piece metal member having a flat horizontal support 332 secured with a fastener 333, shown as a nut and bolt assembly, to the top wall 24 of shroud 14. A plurality of fasteners can be used to attach support 332 to top wall 24. An upwardly extended radial plate 334 is intergraded with the forward portion of support 332. Plate 334 is inclined upwardly and forwardly at an angle of about 45 degrees. Plate 334 can have other angles of inclination. The outer upper end of plate 334 has a downwardly curved ear 336. The cut debris 337 is directed outwardly and downwardly by the front face of plate 334 and ear 336. Base 332 can be attached with an adhesive or bonding material to the top wall 24 of shroud 14. Plate 334 can be an upwardly radial extension of the top wall 24 of shroud 14.

Several embodiments of the knife and deflector assembly and debris deflector has been shown and described as preferred examples of the invention. Changes in shape, size, materials, and arrangement of parts may be made by persons skilled in the art without departing from the scope and substance of the invention.

The invention claimed is:

1. A string trimmer for use by an operator for cutting vegetation comprising:
   a housing,
   a rotatable head mounted on the housing,
   said head including an elongated cord extended generally radially outward from the head,
   a motor operatively connected to the head to move said cord in a circular plane to cut vegetation into cut debris,
   a shroud mounted on the housing and extended over a section of the circular plane of movement of the cord,
   a debris deflector mounted on the shroud extended generally parallel to the circular plane of movement of the cord and in a generally radial outward direction whereby the cut debris is moved away from the shroud by air and the moving cord and directed in a direction away from the operator,
   at least one fastener securing the deflector to the shroud,
   a knife joined to the deflector,
   said knife having a knife edge located between the deflector and the circular plane of movement of the cord,
   said knife edge extended generally parallel to the circular plane of movement of the cord whereby the moving cord and knife edge cut vegetation into cut debris, and
   said at least one fastener securing the deflector and knife to the shroud.

2. The string trimmer of claim 1 wherein:
   the deflector is a generally flat plate having a face for directing the cut debris away from the shroud, and
   a support joined to the plate to retain the plate on the shroud,
   said fastener securing the support to the shroud.

3. The string trimmer of claim 1 wherein:
   the knife has an end section, and a member extended toward the deflector joined to the end section of the knife.

* * * * *